3,597,247
ALUMINA REFRACTORIES
Daniel E. Reardon, Margate, N.J., assignor to
Dresser Industries, Inc., Dallas, Tex.
No Drawing. Filed Mar. 3, 1970, Ser. No. 16,241
Int. Cl. C04b 35/10, 35/46, 35/48
U.S. Cl. 106—57                7 Claims

ABSTRACT OF THE DISCLOSURE

Fired refractory comprising $TiO_2$, $ZrO_2$ and the remainder $Al_2O_3$.

BACKGROUND OF THE INVENTION

Since the advent of the carbon lined hearth and hearth sidewalls in blast furnaces, it is not uncommon for the furnace to run two normal campaigns on one carbon hearth. This improvement in the construction of the furnace has left the bosh and lower sidewall area as the most vulnerable in the furnace. The bosh and lower sidewall linings are continually washed by slags that are reactive with both acid and basic refractories. Slag attack is believed to be one of the primary mechanisms of failure in this area of the lining. The upgrading of the conventional fireclay and high alumina refractories used in these areas has failed to provide sufficiently uniformly wearing linings to take full economic advantage of carbon hearths. Hence, iron makers are turning to entirely new concepts in blast furnace lining. Exotic refractories, such as, those formed by fusion casting, are being installed in the bosh and lower sidewall area. Unfortunately, fused cast refractories are very expensive due to the large amount of electrical energy required for their manufacture, and they have relatively poor thermal shock resistance. The basis for selecting fused cast refractories was their well known superiority to other types of refractories in slag resistance. Fused cast refractories are also used in the linings of glass tank furnaces. The present invention would have utility in certain corrosive areas of such glass tanks.

It is an object of this invention to provide a refractory formable by conventional methods which can be used in the blast furnace and glass tank furnaces.

It is a further object to provide refractories for lining furnaces which wears in a more uniform manner.

Another object of the invention is to provide refractory shapes having relatively good thermal spalling resistance and slag resistance.

According to this invention, a sintered refractory shape is provided comprising from about 0.25 to 1%, by weight, $TiO_2$, from about 0.5 to 10% $ZrO_2$ and the remainder $Al_2O_3$. The $ZrO_2$ to $TiO_2$ ratio is maintained between about 2:1 and 20:1. Preferably, incidental impurities, such as, alkali or alkaline earth oxides are less than about 1%. The total $SiO_2+Fe_2O_3$ content is less than about 2%. $SiO_2$ is detrimental to slag resistance. Preferably, also, the batch sizing for making the shapes is all less than 65 mesh. The porosity of the shapes is less than about 5%. Such shapes, after firing, are mineralogically characterized by homogeneity and fine crystal size and consist of largely corundum with minor amounts of beta alumina and monoclinic zirconia and either zirconium titanate or tetraginal zirconia. Preferred refractories, according to this invention, comprise 0.5 to 1% $TiO_2$, 1 to 5% $ZrO_2$ and the balance $Al_2O_3$.

Further features and other objects and advantages of this invention will become clear to those skilled in the art by a careful study of the description. In this specification and appended claims, all percentages are by weight; chemical analyses are reported as oxides in accordance with the present practice in the refractories industry; and, all size gradings are based upon the standard Tyler mesh series.

Brick according to the teachings of this invention must be fabricated from very finely divided batches. Finely divided is defined as all passing a 65 mesh screen. However, it is preferred that the batches substantially all pass a 325 mesh screen. Such batches can be fabricated into shapes in several ways, for example, by isostatic pressing and slip casting. When shapes according to this invention are to be made by isostatic pressing, the raw batches are prepared by wet ballmilling the batch ingredients to obtain a satisfactory degree of fineness. A binder, such as, polyethylene glycol and/or polyvinyl alcohol is added to the mixture at least 15 mintues before the milling is terminated. After milling, the resulting slurry is spray dryed to form finely divided free flowing powder. The powder is pressed into shapes at about 10,000 p.s.i. isostatically, or elsewhere within the range of 5,000 to 30,000 p.s.i.

The following examples are illustrative of the teachings of the present invention.

EXAMPLE I

A batch was prepared consisting of 5% monoclinic zirconia, 0.5% titania and the balance calcined alumina. To the batch was added 1% of polyvinyl alcohol and polyethylene glycol in a 1:2 ratio. Water was added to the batch to provide a slurry. The slurry was ballmilled and subsequently spray dryed. The spray dryed material was then isostatically pressed into shapes at 10,000 p.s.i. The shapes were burned at 50° F./hr. to 2900° F. After burning, the shapes appeared relatively free of cracking and had a bulk density of 235 p.c.f. and an apparent porosity of 3.8%. The brick were tested for panel spalling [1] and found to have 0.0% loss.

The brick were additionally subjected to the blast furnace drip slag test and found to have a loss of about 33 cubic centimeters.

The slag test comprises placing a sample in a furnace at an angle of approximately 30° to the horizontal. Slag is introduced into the furnace through a water cooled orifice. As the slag enters the furnace, it melts and drips across the surface of the sample being tested. In this test, the temperature of the furnace was 2850° F. 600 grams of slag having the following typical analysis was dripped over the sample.

Slag analysis

| | Percent |
|---|---|
| Silica ($SiO_2$) | 37 |
| Alumina ($Al_2O_3$) | 9 |
| Titania ($HTO_2$) | 0.7 |
| Iron oxide ($Fe_2O_3$) | 0.7 |
| Lime (CaO) | 40 |
| Magnesia (Mgo) | 8.8 |
| Sulfur oxide ($SO_3$) | 2.8 |
| Alkalies | 1 |

The slag is considered neutral to slightly basic because the mols of MgO+CaO exceed the mols of $SiO_2$.

Further, the brick were subjected to the potash-alkali slag and showed no reaction.

A hole 1 inch in diameter and 3 inches deep is drilled into the end of a brick sample (9 x 4½ x 2½ inches) to be tested. Thirty-four grams of a 4:1 mixture by weight of $K_2CO_3$ and $Na_2CO_3$ reagent grade, are placed within the pocket. Unless specified otherwise, the brick samples spaced apart and standing on end, are heated in an

[1] ASTM C 122-67.

oxidizing atmosphere to 2200° F. within three hours and held at this temperature for five hours.

This test however, may also be run under reducing conditions. When such is the case, the samples, set as previously but within a firebrick boxing, are surrounded with coke breeze and the boxing of firebrick is sealed by mortaring. Each of the slag cups has a covering provided by a graphite plate. The temperature is controlled by a thermocouple in a protection tube placed adjacent to a specimen but well within the firebrick boxing. The test is terminated when the thermocouple has indicated 2200° F. for five hours.

EXAMPLE II

Spray dryed monoclinic zirconia powder in an amount of 10% was blended with 0.5% titania and spray dryed calcined alumina. Blending of the powders was accomplished by rolling them in a drum for about 5 minutes. Brick were pressed from the powders at 10,000 p.s.i. The mixes were burned at 2900° F. The brick were tested for panel spalling and were found to have no loss.

EXAMPLE III

Brick were formed in the same manner as Example I from two different compositions. One composition analyzed 1% monoclinic zirconia and .5% titania with the balance being calcined alumina. The other composition analyzed 0.25% $TiO_2$; 0.5% $ZrO_2$ and the balance calcined alumina. These brick from both compositions were tested and found to have 0.0% panel spalling loss.

EXAMPLE IV

Brick were prepared in hte same manner as Example I containing 98.5% calcined alumina, 1% lime-stabilized zirconia and 0.5% titania. After burning as above, the shapes were tested and found to have a bulk density of 233 p.c.f. and an apparent porosity of 3.7%.

While applicant has shown that shapes according to the teachings of this invention can be fabricated by isostatic pressing, they can also be fabricated by slip casting. Slip casting techniques for powdered batches are well known in the ceramics art. Because of the large size of the refractory shapes required, it is not suitable, according to this invention, to shape brick by hot pressing. Hot pressing techniques typically require compositions having a proportion of coarsely sized grain.

In the above examples, the calcined alumina employed analyzed more than 99% $Al_2O_3$ with small amounts of incidental impurities.

The titanium dioxide used above was in pigment grade form. Such titanium dioxide is usually a chemical precipitate, frequently calcined. Preferably, the oxide is finely divided to the extent that substantially all of the particles are 5 microns or less in size.

The zirconia utilized above was of two types, unstabilized monoclinic zirconia and stabilized cubic zirconia. Stabilized zirconia is zirconia substantially entirely exhibiting a cubic crystalline structure, the individual crystals of which are "propped" as it were, to prevent phase alterations regardless of variations in temperature. The particular stabilized zirconia employed contained about 3 to 6% of 99+% purity calcium oxide.

Having thus described the invention in detail, and with sufficient particularity as to enable those skilled in the art to practice it, what is desired to have protected by Letters Patent is set forth in the appended claims.

I claim:
1. A fired refractory shape comprising from about 0.25 to 1%, by weight, $TiO_2$, from about 0.5 to 10%, by weight, $ZrO_2$ and the remainder, except for incidental impurities, being $Al_2O_3$.
2. A fired refractory according to claim 1 in which the $TiO_2$ by analysis is between 0.5 to 1%, and the $ZrO_2$ is between 1 and 5%.
3. A fired refractory according to claim 1 comprising less than 1% impurities.
4. A fired refractory according to claim 1 in which the $TiO_2$, $ZrO_2$ and $Al_2O_3$, before, firing, are substantially all of −325 mesh particle size.
5. A fired refractory according to claim 1 in which the ratio of $ZrO_2$ to $TiO_2$ by oxide analysis is between about 2:1 and 20:1.
6. A fired refractory according to claim 1 in which the apparent porosity is less than about 5%.
7. A fired refractory according to claim 1 in which no more than about 2% total of $SiO_2+Fe_2O_3$ is present.

References Cited

UNITED STATES PATENTS

| | | | |
|---|---|---|---|
| 3,378,385 | 4/1968 | McCreight et al. | 106—65 |
| 3,414,418 | 12/1968 | Hubble et al. | 106—65 |
| 3,454,385 | 7/1969 | Amero | 106—65 |
| 3,519,447 | 7/1970 | Adams et al. | 106—65 |

JAMES E. POER, Primary Examiner

U.S. Cl. X.R.

106—65